Figure 1:
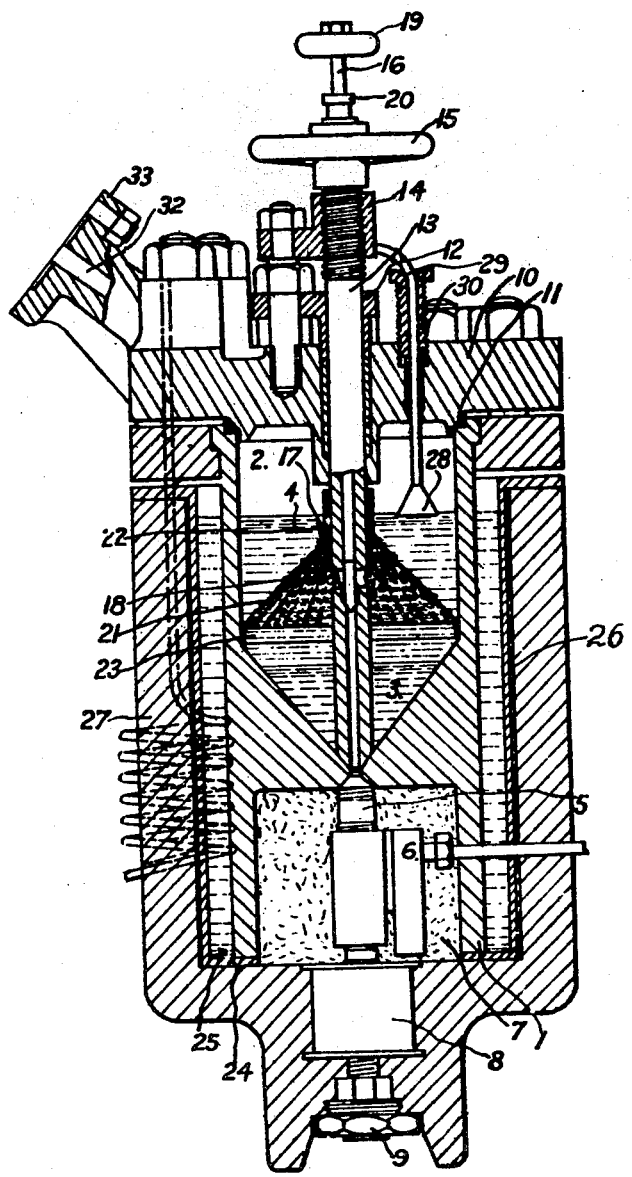

March 16, 1948.  H. DREYFUS ET AL  2,437,687
MELT EXTRUSION OF ARTIFICIAL FILAMENTS, FILMS AND
THE LIKE AND APPARATUS THEREFOR
Filed Dec. 7, 1944  2 Sheets-Sheet 1

Inventors
H. DREYFUS
W. POOL
Attorney

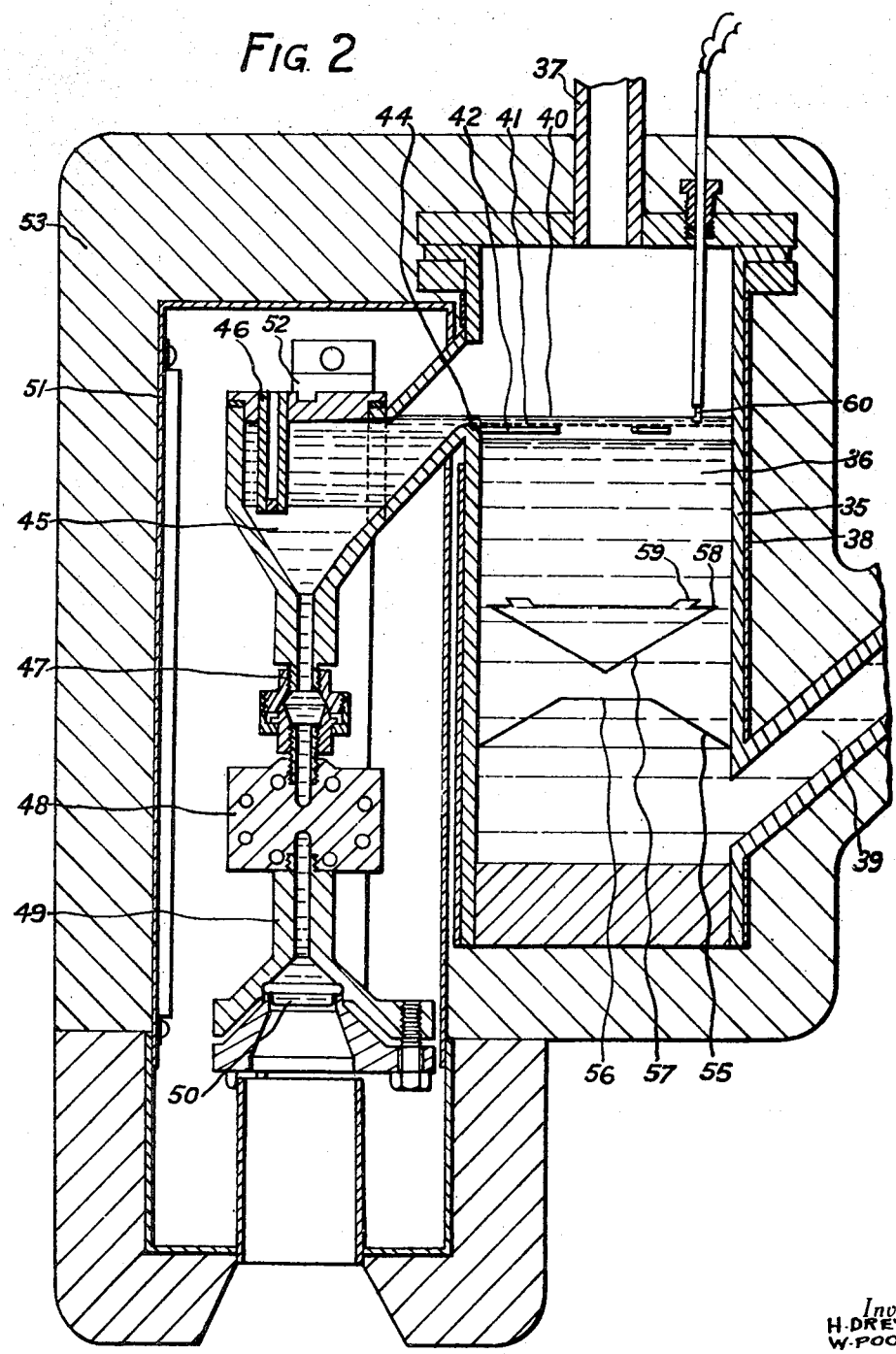

Patented Mar. 16, 1948

2,437,687

UNITED STATES PATENT OFFICE 2,437,687

MELT EXTRUSION OF ARTIFICIAL FILAMENTS, FILMS AND THE LIKE AND APPARATUS THEREFOR

Henry Dreyfus, London, and William Pool, Spondon, near Derby, England; Claude Bonard, administrator of said Henry Dreyfus, deceased, assignors to Celanese Corporation of America, a corporation of Delaware Application December 7, 1944, Serial No. 567,062
In Great Britain November 24, 1943

Section 1, Public Law 690, August 8, 1946
Patent expires November 24, 1963

15 Claims. (Cl. 18—8)

This invention relates to the production of artificial filaments, films, foils and like materials and particularly to the production of artificial materials by the spinning or extrusion of fused thermoplastic compositions.

U. S. applications S. No. 519,613, filed January 25, 1944, and S. No. 522,458, filed February 15, 1944, describe methods of spinning or otherwise extruding molten organic filament-forming compositions, and particularly the melting of such compositions for the purpose of spinning or extruding, in which the melting is effected by feeding the composition to the point from which it is extruded through a body of liquid that is maintained at a temperature sufficiently high to melt the composition, a grid or sieve being provided in the path of the composition through the body of heating liquid in order to retain any pieces of solid composition until they are melted. Heating of the liquid is most conveniently effected through the walls of the vessel containing the body of liquid. It has been found that, even where such a grid or sieve is provided, fragments of solid material, when small enough by reason of the melting taking place at their surfaces, are apt to pass through and may reach the point of extrusion without being melted after leaving the grid or sieve. This is more especially the case when, as is usual, it is required that the temperature of the molten composition should at no time be much above the melting point of the composition.

It has now been found that if, in the spinning or otherwise shaping by extrusion of a molten filament-forming composition, the solid composition is introduced into a vessel containing a heating liquid and, in its passage through the liquid to the point of extrusion, is deflected towards the walls of the vessel or other locality in which heat is communicated to the liquid, a better and more uniform degree of melting of the composition during such passage is obtained. This may possibly be due to an increased time taken for the passage of the composition through the liquid, or to the fact that it is brought close to a zone in which heat is most readily available, either directly from the walls of the vessel or by reason of rising currents of the heating liquid in the neighbourhood of these walls, or to a combination of any or all of these factors.

For the purpose of bringing about the deflection of the composition a baffle may be employed, immersed in the liquid and adapted by reason of its shape and its position in the vessel, to urge the composition outwards towards the walls.

Where, as in U. S. application S. No. 522,458 the heating fluid is of lower specific gravity than the composition to be melted, the solid composition sinks through it under gravity and meets the baffle over the surface of which it moves, still under gravity, until it reaches the wall of the vessel, between which and the edge of the baffle there is only a narrow gap. Examples of heating liquids suitable for this purpose are fatty alcohols containing at least 12 carbon atoms such as stearyl alcohol, and aliphatic hydrocarbons containing a large number of carbon atoms, e. g. 30–40.

Where on the other hand, as is preferably the case in U. S. application S. No. 519,613 the heating liquid is a molten metal or some other liquid of higher specific gravity than the composition, the baffle is reversed and the solid composition introduced into the liquid floats upwards until it strikes the underside of the baffle.

As the baffle, a grid or sieve, e. g. of wire mesh or perforated sheet metal, may be employed which instead of extending straight across the vessel, is of conical form, so that the composition, on reaching and resting on it, has a tendency to slide outwards across the grid until it reaches the wall of the vessel, with which the edge of the baffle contacts. It is preferred to use a grid or sieve of this kind when the heating liquid is of low thermal conductivity, since the transfer of heat within the vessel then depends largely on convection currents, to which the grid or sieve allows free play. Where the heating liquid is a molten metal, however, and has a high thermal conductivity, this point is of less importance and, instead of a coned grid or sieve, a continuous plate immersed in the liquid may be used, domed or of a conical shape so as not to retain the composition.

Flat grids or sieves may be employed in conjunction with the baffles described above and may be disposed before the baffle, so as to retain the larger pieces of composition, or after it, or both. Furthermore, if necessary a plurality of baffles may be employed, the first directing the composition towards the walls of the vessel, the next towards the centre again and the third, if such is employed, towards the walls once more and so on.

The invention is applicable generally to methods of spinning or extruding continuously in which solid composition is introduced into a melting vessel at the same time as the molten composition is being withdrawn from said vessel for spinning or extrusion. The method may, however, be employed in batch processes wherein a single charge of composition in a vessel is first melted and then extruded without the introduction of further material, the charge of composition in this case being placed on the side of the baffle or baffles (and of the grid or sieve if such is employed) remote from the extrusion point, whereby the time of passage of the composition through the heating liquid is prolonged.

The apparatus is preferably arranged so that the quantity of molten composition available for extrusion at any time is a minimum consistent with the maintenance of a constant supply. In this way, the period during which the composition is exposed to the temperature necessary to melt it is further reduced. For reasons of lightness and economy, it is also desirable that the body of heating liquid should be as small as possible having regard to its function as a reservoir of heat from which heat is drawn to melt the composition employed. If desired, the apparatus may be arranged so that two or more pumps may be fed from a single pool or reservoir of molten composition.

The heating of the heating liquid may be effected by any convenient means according to the temperature to be maintained and other relevant considerations. Thus, the vessel in which the composition is melted may be surrounded with electrical windings, or it may be enclosed in a jacket containing a heating fluid. In the latter case, a closed jacket may be used, constituting a reflex boiler in which the fluid evaporates from a liquid phase, and condenses in the upper part of the jacket and runs down to the liquid again. The whole apparatus is preferably externally lagged so as to prevent undue loss of heat and discomfort to the operatives. It is convenient for the vessel containing the heating liquid and the pump by means of which the molten composition is extruded, to be enclosed together as a single heat-insulated unit.

Control of the heat supplied to the apparatus can be effected by suitable temperature regulating means in accordance with the temperature existing at some point within the apparatus. Thus, where a jacket in the form of a reflex boiler is used, the pressure in the jacket may be controlled so as to maintain it, and consequently the temperature, substantially constant. While it is desirable to supply heat to all sections of the apparatus containing liquid heating medium or molten composition, separate sources of heat under separate temperature controls may be employed for the different parts, e. g. one control for the melting vessel and another for the pump and the passage by which molten composition is fed to it. Again, the supply of heat to the melting vessel may be effected and controlled by jacketting the vessel, while the heating of the pump and the control of that heating may be effected electrically.

By way of example two forms of melt spinning apparatus provided with deflecting baffles in accordance with the present invention will now be described in greater detail with reference to the accompanying drawings, in which Fig. 1 is a sectional elevation of a form of apparatus embodying the features of U. S. application S. No. 522,458, and Fig. 2 is a sectional side elevation of a further form of apparatus embodying the features of U. S. application S. No. 519,613.

The apparatus shown in Figure 1 comprises a cylindrical steel vessel 1 in the upper part of which is formed the melting chamber which consists of a cavity 2 of cylindrical form at the top and of conical form at the bottom. A pool 3 of molten composition forms in the bottom of the conical part, while a heating liquid 4, by contact with which the composition is melted, fills the rest of the conical part and about half of the cylindrical part. From the apex of the conical part, a passage 5 leads to a spinning pump 6 contained in another cavity 7 of the steel vessel. The cavity 7 is packed with copper turnings to provide, in conjunction with the metal of the vessel 1, a reservoir of high heat capacity about the pump 6. The pump 6 forces the molten composition through a filter 8 and spinning jet 9. The melt chamber 2 is closed by means of a heavy steel cover 10 bolted on the top of the vessel 1, suitable sealing rings 11 being provided to prevent leakage.

Through a gland 12 in the middle of the cover 10 passes a valve rod 13 having a coned end which fits the apex at the bottom of the melt chamber 2, thereby permitting the sealing off of the melt chamber 2 from the spinning pump 6. The valve rod 13 is screw threaded to work in a threaded part 14 of the cover, and is provided with a hand wheel 15 so that the valve may be opened from outside the melt chamber 10. The rod itself is bored axially from end to end and is screw threaded internally to receive an auxiliary valve rod 16 the lower end of which is pointed so as to fit on a conical seat 17 inside the main valve rod 13. Just above the conical seat 17 and at a height between the level of the molten composition 3 and the heating liquid 4, the main valve rod 13 is provided with axial passages 18 giving communication from inside the melt chamber 2 to the bore of the rod 13. The auxiliary valve rod 16 is also screw threaded and provided with hand wheel 19, and enters the bore of the main valve rod through a pressure gland 20. By these means, the molten composition can be displaced from the pump 6, filter 8 and jet 9 when desired, e. g. for changing the jet or filter, by means of the heating liquid, the main valve being closed and the auxiliary valve opened. Or again the pump can be primed with the heating liquid while the composition is being initially melted, and when a sufficient pool of molten composition has been formed, the main valve may be opened and the auxiliary valve closed so that the pump is supplied with the composition. The vessel 1 is surrounded by a jacket 24 containing a heating liquid 25. The jacket 24 is externally wound with electrical heating coils 26, by which heat is supplied to the vessel 1, and outside the heating coils 26 the walls are covered with heat-insulating material 27 to prevent undue loss of heat.

The melt chamber 2 contains a level-indicating device in the form of a conical bulb 28 containing mercury or other fluid of suitable thermometric properties, and connected at its apex with a capillary tube 29 passing through a gland 30 in the cover 10. The broad base of the conical bulb is disposed at the desired minimum level of the heating liquid 4 within the melt chamber 2. By these means, as is described in U. S. application S. No. 566,900, filed December 6, 1944, now abandoned, an indication may be obtained when the level of the liquid 4 falls below the base of the bulb 28, showing that further composition should be introduced into the melt chamber 2. The capillary tube 29 may either be arranged to give a visual indication of this kind, or may be connected to suitable mechanical means, as described for example in the above specification, for automatically feeding fresh composition.

The composition to be melted is fed into the chamber 2 by way of an oblique passage 32 through the cover 10 of the vessel 1, the passage 32 terminating outside the vessel in a flange 33 to which is attached suitable feeding means, e. g., automatic means of the kind described in U. S. application S. No. 566,901, filed December 6, 1944. Nitrogen under pressure is supplied to the chamber 2 by a passage (not shown) similar to the passage 32 but disposed on the opposite side of the cover 10, the back-pressure of the nitrogen so supplied assisting the pump 6 in extruding the fused composition at a uniform rate.

Extending completely across the cylindrical part of the melt chamber 2, and completely submerged in the heating liquid 4, is a conical grid 21 formed of wire mesh. The apex of the grid 21 points upwards and terminates in a cylinder 22 closely surrounding the valve rod 13, while its base terminates in a cylinder 23 contacting with the walls of the chamber 2. The grid 21 constitutes a baffle by which the solid composition is deflected towards the walls of the chamber 2, i. e. the locality at which heat is supplied to the chamber from the jacket 24. The application of heat through the side walls of the chamber sets up vigorous convection currents in the neighbourhood of the walls, the mesh structure of the grid 21 allowing free play to these currents, to which the solid composition is subjected until it is melted and passes down to the pool of fused composition 3.

The apparatus shown in Fig. 2 comprises a melting vessel 35 adapted to contain a molten alloy consisting of equal parts by weight of lead and tin, indicated at 36. Nitrogen, substantially at atmospheric pressure, is supplied to the vessel 35 through the inlet 37, and the vessel is surrounded by electrical heating elements 38, by means of which the metal 36 is maintained at the appropriate temperature above its melting point. The composition to be melted is introduced into the vessel 35 by way of an oblique passage 39, and is melted in the vessel, the molten composition collecting as a pool 40 above the level of the liquid 36. A grid or sieve 41 supported on pins 42 extending inwardly from the walls of the vessel 35 retains any small pieces of solid composition reaching the surface of the liquid 36. The molten composition flows over a weir 44 into a funnel 45 provided with a thermometer pocket 46 and is fed from the funnel 45 by way of appropriate connections 47 to a spinning pump 48. From the pump 48 the molten composition is forced through passages 49 to a spinning jet 50. The members 45 to 50 are contained in a closed chamber 51 provided with heater elements 52 by means of which the temperature of the members within the chamber 51 is kept up. The whole apparatus is heavily lagged by means of heat insulating material 53.

The solid composition, entering the chamber 35 by being forced down the oblique passage 39, immediately floats upwards in the molten metal 36 and encounters a conical baffle 55 closely fitting the walls of the vessel 35 but open at the top 56, so that the solid material as it floats upwards is drawn towards the middle of the vessel. On passing through the opening 56 the material encounters a further conical member 57 whose edges 58 are spaced from the walls of the vessel 35, the member 57 being retained in position and attached to the walls of the vessel by means of lugs 59 extending from the edge 58. By these means the solid composition entering the vessel 35 is forced to the centre of the vessel and then outwards to the walls of the vessel, lodging between the walls of the vessel and the edge 58 of the member 57 until they are sufficiently melted to pass through. Small pieces of composition passing the member 57 are retained in the vessel 35 until melted by means of the grid or sieve 41. The high heat conductivity of the molten metal 36 permits baffles of continuous sheet material to be used without unduly affecting the uniformity of the distribution of heat within the chamber 35.

The quantity of composition in the vessel 35 is controlled in accordance with the indications of a thermo-couple element 60 having two thermo-junctions, one just above the level of the weir 44 and the other just below. So long as the molten composition is above the level of the weir 44 both thermo-junctions are at the same temperature and no electromotive force is generated by the thermo-couple 60. If the level of the pool 40 falls to that of the weir 44, however, the upper thermo-junction is in the gaseous phase above the pool 40 while the lower thermo-junction is in the pool 40 and the thermo-junctions are at different temperatures. In consequence an E. M. F. is generated in the thermocouple which may be suitably recorded, e. g. by a galvanometer, to give an indication upon which fresh composition is fed to the vessel 35. Feeding of fresh material raises the level of the molten alloy 36 and of the pool 40 so that the upper junction of the thermocouple is again submerged, and the molten composition continues to be supplied to the pump 48. As the composition melts and rises to the surface of the alloy 36, the level of the alloy falls, but the level of the pool 40 is not substantially affected thereby.

The invention is applicable generally to the spinning or extrusion of organic filament-forming compositions that may be spun in the molten state and is particularly advantageous where, as is commonly the case with such compositions, the compositions are liable to decompose or be otherwise injuriously affected at temperatures not much exceeding those necessary to melt them. Examples of such materials are the synthetic linear superpolyamides made, e. g. by the condensation of diamines with dicarboxylic acids. Or the compositions may be polyvinyl compounds, e. g. polyvinylidene chloride or copolymers of vinyl chloride with vinyl acetate. Or again, the invention may be applied to compositions having a basis of cellulose derivatives such as organic esters of cellulose including mixed esters, e. g. cellulose acetate, cellulose propionate or cellulose butyrate, cellulose acetate-butyrate, cellulose acetate-propionate and cellulose acetate-stearate or cellulose ethers such as ethyl and benzyl cellulose.

Having described our invention, what we desire to secure by Letters Patent is:

1. Process for the production of artificial materials by extrusion of fused filament-forming compositions, said process comprising introducing the composition in a solid state into one part of a melting vessel containing a heating liquid, withdrawing said composition in a fused state from another part of said vessel spaced from the first and extruding the composition as it is so withdrawn, applying heat at a locality of said vessel so as to heat said heating liquid and the fuse said composition by contact with said liquid during the passage of said composition from the part of the vessel into which the composition is introduced to the part from which it is withdrawn and, in the course of said passage, deflecting solid composition towards the locality at which heat is applied to said vessel.

2. Process for the production of artificial materials by extrusion of fused filament-forming compositions, said process comprising introducing the composition in a solid state into one part of a melting vessel containing a heating liquid, withdrawing said composition in a fused state from another part of said vessel spaced from the first and extruding the composition as it is so withdrawn, applying heat to the side walls of said vessel so as to heat said heating liquid and to fuse said composition by contact with said liquid during the passage of said composition from the part of the vessel into which the composition is introduced to the part from which it is withdrawn and, in the course of said passage, deflecting solid composition alternately towards and away from said side walls.

3. Process for the production of artificial materials by extrusion of fused filament-forming compositions, said process comprising introducing the composition in a solid state into one part of a melting vessel containing a heating liquid, withdrawing said composition in the fused state from another part of said vessel spaced from the first and extruding the composition as it is so withdrawn, applying heat at a locality of said vessel so as to heat said heating liquid and to fuse said composition by contact with said liquid during the passage of said composition from the part of the vessel into which the composition is introduced to the part from which it is withdrawn and, in the course of said passage, and while permitting substantially free convection of said heating liquid in said vessel, deflecting solid composition towards the locality at which heat is applied to said vessel.

4. Process for the production of artificial materials by the extrusion of fused filament-forming compositions said process comprising withdrawing fused composition from one part of a melting vessel containing a heating liquid and extruding the composition as it is withdrawn, maintaining a supply of composition in said part of the vessel by feeding solid composition, in the course of the withdrawal and extrusion of fused composition, to another part of said vessel whereby said solid composition passes through said heating liquid to said first-mentioned part and is fused during its passage by contact with said heating liquid, applying heat to a locality of said vessel so as to heat said heating liquid and, in the course of the passage of solid composition through said heating liquid, deflecting said solid composition towards the locality at which heat is applied to said vessel.

5. Process for the production of artificial materials by the extrusion of fused filament-forming compositions said process comprising withdrawing fused composition from one part of a melting vessel containing a heating liquid and extruding the composition as it is withdrawn, maintaining a supply of composition in said part of the vessel by feeding solid composition, in the course of the withdrawal and extrusion of fused composition, to another part of said vessel whereby said solid composition passes through said heating liquid to said first-mentioned part and is fused during its passage by contact with said heating liquid, applying heat to the side walls of said vessel so as to heat said heating liquid and, in the course of the passage of solid composition through said heating liquid and while permitting substantially free convection of said heating liquid, deflecting said solid composition from the middle of said vessel to said side walls.

6. Process for the production of artificial materials by the extrusion of fused filament-forming compositions, said process comprising withdrawing fused composition from the lower part of a melting vessel containing a heating liquid of lower density than the composition and extruding the composition as it is withdrawn, maintaining a supply of composition in the lower part of the vessel by feeding solid composition, in the course of the withdrawal and extrusion of fused composition, to the upper part of said vessel whereby said solid composition sinks through said heating liquid to said lower part and is fused during its passage by contact with said heating liquid, applying heat to a locality of said vessel so as to heat said heating liquid and, in the course of the passage of solid composition through said heating liquid, deflecting said solid composition towards the locality at which heat is applied to said vessel.

7. Process for the production of artificial materials by the extrusion of fused filament-forming compositions, said process comprising withdrawing fused composition from the lower part of a melting vessel containing a heating liquid of lower density than the composition and extruding the composition as it is withdrawn, maintaining a supply of composition in the lower part of the vessel by feeding solid composition, in the course of the withdrawal and extrusion of fused composition, to the upper part of said vessel whereby said solid composition sinks through said heating liquid to said lower part and is fused during its passage by contact with said heating liquid, applying heat to the side walls of said vessel so as to heat said heating liquid and, in the course of the passage of solid composition through said heating liquid and while permitting substantially free convection of said heating liquid, deflecting said solid composition from the middle of said vessel to said side walls.

8. Apparatus for the production of artificial materials by the extrusion of fused thermoplastic compositions, said apparatus comprising a melting vessel, a heating medium in said vessel that is liquid at the melting temperature of the composition to be extruded and is adapted to melt solid composition in said vessel by contact therewith, heating means for suppling heat to said heating medium at a locality of said vessel, means for withdrawing fused composition from said vessel and extruding it as it is so withdrawn, and stationary baffle means within said vessel and below the level of said medium, said baffle means extending over substantially the whole area of cross-section of said vessel so as to positively constrain the composition, as it passes through said heating medium to said withdrawing means, into the immediate locality at which heat is supplied by said heating means.

9. Apparatus for the production of artificial materials by the extrusion of fused thermoplastic compositions, said apparatus comprising a melting vessel, a heating medium in said vessel that is liquid at the melting temperature of the composition to be extruded and is adapted to melt solid composition in said vessel by contact therewith, heating means for supplying heat to said heating medium at a locality of said vessel, means for withdrawing fused composition from one part of said vessel and extruding it as it is so withdrawn, means for supplying solid composition, in the course of the withdrawal and extrusion of the fused composition, to another part of said vessel spaced from the first-mentioned part, and stationary baffle means within said vessel and below the level of said medium, said baffle means extending over substantially the whole area of cross-section of said vessel so as to positively constrain the composition, as it passes through said heating medium to said withdrawing means, into the immediate locality at which heat is supplied by said heating means.

10. Apparatus for the production of artificial materials by the extrusion of fused thermoplastic compositions, said apparatus comprising a melting vessel, a heating medium in said vessel that is liquid at the melting temperature of the composition to be extruded and is adapted to melt solid composition in said vessel by contact therewith, heating means for supplying heat to said heating medium through the side walls of said vessel, means for withdrawing fused composition from one part of said vessel and extruding it as it is so withdrawn, means for supplying solid composition, in the course of the withdrawal and extrusion of the fused composition, to another part of said vessel spaced from the first-mentioned part, and stationary baffle means within said vessel and below the level of said medium, said baffle means extending over substantially the whole area of cross-section of said vessel so as to positively constrain the composition from the middle of said vessel into contact with the side walls thereof as said composition passes through said heating medium to said withdrawing means.

11. Apparatus for the production of artificial materials by the extrusion of fused thermoplastic compositions, said apparatus comprising a melting vessel, a heating medium in said vessel that is liquid at the melting temperature of the composition to be extruded and is adapted to melt solid composition in said vessel by contact therewith, heating means for supplying heat to said heating medium through the side walls of said vessel, means for withdrawing fused composition from one part of said vessel and extruding it as it is so withdrawn, means for supplying solid composition, in the course of the withdrawal and extrusion of the fused composition, to another part of said vessel spaced from the first-mentioned part, and a plurality of stationary baffles within said vessel and below the level of said medium, said baffles extending over substantially the whole area of cross-section of said vessel so as to positively constrain the composition alternately into contact with and away from the side walls thereof as said composition passes through said heating medium to said withdrawing means.

12. Apparatus for the production of artificial materials by the extrusion of fused thermoplastic compositions, said apparatus comprising a melting vessel, a heating medium in said vessel that is liquid at the melting temperature of the composition to be extruded and is adapted to melt solid composition in said vessel by contact therewith, heating means for supplying heat to said heating medium at a locality of said vessel, means for withdrawing fused composition from one part of said vessel and extruding it as it is so withdrawn, means for supplying solid composition, in the course of the withdrawal and extrusion of the fused composition, to another part of said vessel spaced from the first-mentioned part, and baffle means in the form of a stationary grid within said vessel and below the level of said medium, adapted to permit the passage of convection currents in said heating medium, said grid extending over substantially the whole area of cross-section of said vessel so as to deflect the composition, as it passes through said heating medium to said withdrawing means, into the immediate locality at which heat is supplied by said heating means.

13. Apparatus for the production of artificial materials by the extrusion of fused thermoplastic compositions, said apparatus comprising a melting vessel, a heating medium in said vessel that is liquid at the melting temperature of the composition to be extruded and of lower density than the said composition and is adapted to melt solid composition in said vessel by contact therewith, heating means for supplying heat to said heating medium at a locality of said vessel, means for withdrawing fused composition from the lower part of said vessel and extruding it as it is so withdrawn, means for supplying solid composition, in the course of the withdrawal and extrusion of the fused composition, to the upper part of said vessel, and stationary baffle means within said vessel and below the level of said medium, said baffle means extending over substantially the whole area of cross-section of said vessel so as to positively constrain the composition, as it passes through said heating medium to said withdrawing means, into the immediate locality at which heat is supplied by said heating means.

14. Apparatus for the production of artificial materials by the extrusion of fused thermoplastic compositions, said apparatus comprising a melting vessel, a heating medium in said vessel that is liquid at the melting temperature of the composition to be extruded and of lower density than the said composition and is adapted to melt solid composition in said vessel by contact therewith, heating means for supplying heat to said heating medium through the side walls of said vessel, means for withdrawing fused composition from the lower part of said vessel and extruding it as it is so withdrawn, means for supplying solid composition, in the course of the withdrawal and extrusion of the fused composition, to the upper part of said vessel, and a conical grid extending across the vessel and disposed apex upwards and below the level of said medium, adapted to permit the free passage of convection currents in said medium and positively to constrain the composition from the middle of said vessel into contact with the side walls thereof as said composition passes through said heating medium to said withdrawing means.

15. Apparatus for the production of artificial materials by the extrusion of fused thermoplastic compositions, said apparatus comprising a melting vessel, a heating medium in said vessel that is liquid at the melting temperature of the composition to be extruded and of greater density than the said composition and is adapted to melt solid composition in said vessel by contact therewith, heating means for supplying heat to said heating medium at a locality of said vessel, means for withdrawing fused composition from the upper part of said vessel and extruding it as it is so withdrawn, means for supplying solid composition, in the course of the withdrawal and extrusion of the fused composition, to the lower part of said vessel, and baffle means within said vessel and below the level of said medium, adapted positively to constrain the composition, as it passes through said heating medium to said withdrawing means, into the immediate locality at which heat is supplied by said heating means.

HENRY DREYFUS.
WILLIAM POOL.

REFERENCES CITED

The following references are of record in the file of this patent:

UNITED STATES PATENTS

| Number | Name | Date |
| --- | --- | --- |
| 2,369,506 | Weibel | Feb. 13, 1945 |
| 2,177,658 | Kimble et al. | Oct. 31, 1939 |
| 2,217,743 | Greenewalt | Oct. 15, 1940 |
| 2,303,340 | Dreyfus | Dec. 1, 1942 |
| 2,309,729 | Gordon | Feb. 2, 1943 |
| 2,303,339 | Dreyfus | Dec. 1, 1942 |